(12) United States Patent
Pharris et al.

(10) Patent No.: US 8,245,307 B1
(45) Date of Patent: Aug. 14, 2012

(54) PROVIDING SECURE ACCESS TO A SECRET

(75) Inventors: Brian S. Pharris, Sunnyvale, CA (US); Jeffrey S. Tuckey, Los Gatos, CA (US); Haixia Shi, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1519 days.

(21) Appl. No.: 11/641,380

(22) Filed: Dec. 18, 2006

(51) Int. Cl.
*H04L 9/00* (2006.01)
*H04L 9/32* (2006.01)
(52) U.S. Cl. .............................. 726/27; 726/26; 713/176
(58) Field of Classification Search .................... 726/27
See application file for complete search history.

(56) References Cited

U.S. PATENT DOCUMENTS

| | | | |
|---|---|---|---|
| 5,987,133 A * | 11/1999 | Aisaka | 713/170 |
| 7,043,616 B1 | 5/2006 | McGrath | |
| 7,545,931 B2 * | 6/2009 | Dillaway | 380/44 |
| 2003/0226014 A1 | 12/2003 | Schmidt et al. | |
| 2005/0081039 A1 * | 4/2005 | Lee et al. | 713/176 |
| 2005/0166069 A1 * | 7/2005 | Hashimoto et al. | 713/194 |
| 2006/0101454 A1 * | 5/2006 | Whitehead | 717/168 |

FOREIGN PATENT DOCUMENTS

WO WO 03/048908 A2 6/2003

OTHER PUBLICATIONS

Giuseppe Ateniese, Efficient Verifiable Encryption (and Fair Exchange) of Digital Signatures, Nov. 1999, ACM, 1-58113-14B-B/99/0010.*

* cited by examiner

*Primary Examiner* — Farid Homayounmehr
*Assistant Examiner* — Samuel Ambaye
(74) *Attorney, Agent, or Firm* — Kilpatrick Townsend & Stockton LLP

(57) ABSTRACT

Methods, devices, and systems of protecting a secret are provided. Access to the secret is designed to be restricted to a code with a specific signature, or fingerprint. The signature of that code is used in the encryption of the secret, and other codes are prevented from using this signature to decrypt the secret. This restricted access to the secret prevents the secret from being easily compromised, for example, by preventing a change in the code.

21 Claims, 7 Drawing Sheets

PROVIDING SECURE ACCESS TO A SECRET

BACKGROUND OF THE INVENTION

The present invention relates in general to cryptography, and in particular to providing secure access to a secret.

In this era of digital entertainment, content that is stored as a digital file can easily be copied without any loss of quality. The movie and music industries lose vast amounts of money due to illegal copying and sharing of this content. Efforts have been made to provide digital rights management (DRM) to deliver content to a consumer without also allowing the consumer to copy the content. High-Bandwidth Digital Content Protection (HDCP) is a DRM standard developed to control digital audio and video content as it travels across, for example, Digital Visual Interface (DVI) or High Definition Multimedia Interface (HDMI) connections (e.g., from a DVD player to a display device).

As part of HDCP or other content protection protocols, a content data stream is to be encrypted any time it travels between devices. For example, the data stream from a content medium, such as High Definition (HD) DVD and Blu-ray Discs, is encrypted. However, the data stream typically requires processing, e.g. by a graphics processing unit (GPU) within a DVD player, which must be done with the unencrypted data. Thus, the GPU must decrypt, process, and then re-encrypt the data stream before sending it to a display.

The display key used by the GPU in the re-encryption process needs to be kept a secret, or else all content may be compromised. Additionally, the HDCP standard specifies that if the re-encryption process performed by a particular GPU is cracked, then only that GPU is compromised. In other words, the information obtained in the cracking of the re-encryption process for one GPU should not be useful for cracking the re-encryption process of another GPU.

Therefore it is desirable to provide methods, devices, and systems of keeping the display key secret while allowing use of the display key in a re-encryption process. It is further desirable to ensure that the compromise of one secret display key does not result in the compromise of all display keys.

BRIEF SUMMARY OF THE INVENTION

Embodiments of the present invention provide methods, devices, and systems of protecting a secret. In one aspect, access to the secret is designed to be restricted to a code with a specific signature, or fingerprint. To this end, the signature of that code is used in the encryption of the secret. This restricted access to the secret prevents the secret from being easily compromised, for example, the code is prevented from outputting the secret as such an action would change the signature of the code. In another aspect, access to the secret is restricted in that only a result produced by operating the secret onto data can be accessed.

According to one exemplary embodiment, a method of protecting a secret is provided. The secret is protected by encrypting the secret using a signature of a first code that is configured to decrypt the secret. A signature of a first code is determined. The signature is encrypted with a first key to obtain an encrypted signature, which is then used to encrypt the secret to obtain the encrypted secret. The encrypted secret is placed, stored, or otherwise situated to allow a processor configured to execute the first code to access the encrypted secret and decrypt it. The secret may be any type of data or message. For example, the secret may be a key for encrypting data to be sent to a display or audio device, such as a receiver or speakers. In one aspect, the encrypted secret is publicly accessible.

In some embodiments, a second code encrypts the secret, and the encrypted secret is transmitted from the second code to the first code. In other embodiments, the encrypted secret is stored on a system having a processor configured to run the first code. In one aspect, the first key and the secret are specific to that system. Using the first code, the secret may be obtained by decrypting the encrypted secret with the encrypted signature, which results from encrypting the signature with the first key. As a further layer of protection, the first key may be accessible only via a function call to encrypt the signature of the code containing the function call.

In some embodiments, before the first code is allowed to decrypt the encrypted secret, the first code is authenticated by determining the signature of the first code with a code-signing key and by comparing the signature to an expected value for the signature. The code-signing key may be used to authenticate other codes, e.g. as a universal key. In one aspect, if the signature equals the expected value, the signature is stored in a register of a processor, and the first code is run on the processor. When the first code is not actively running, the signature may be removed from the register. In another aspect, the signatures for any two different codes are different to a high degree of probability.

According to another exemplary embodiment, a system for protecting a secret includes a memory element that stores an encrypted secret, a processing unit including a secure processor, and a control store communicably coupled to the processing unit and storing a first code executable by the secure processor. The memory element may reside off-chip from the processing unit. The secure processor includes logic to determine a signature of the first code. The first code includes code instructing the secure processor to encrypt the signature using a first key to obtain an encrypted signature; and code instructing the secure processor to decrypt the encrypted secret using the encrypted signature as a key.

In some embodiments, the code instructing the secure processor to encrypt the signature includes code invoking a hardwired function of the secure processor that encrypts a signature of a code that calls the hardwired function. In one aspect, the secure processor is configured to encrypt of the signature of the first code only when the hardwired function is called from within the first code, and the first key is accessible only to encrypt a signature of a code invoking the hardwired function.

In some embodiments, the logic to determine a signature of the first code includes a hardwired function of the secure processor that: determines the signature of the first code using a code-signing key; compares the signature to an expected value for the signature; and executes the first code if the signature equals the expected value. In other embodiments, the first key and the secret are specific to the system. The system may be a graphics subsystem, and the processing unit may be a graphics processing unit.

According to another exemplary embodiment, a computer program product having a computer readable medium encoded with program code for controlling operation of a computer system to decrypt an encrypted secret is provided. The program code includes a first code that, using a key, encrypts a signature of the first code itself to obtain an encrypted signature. The first code also decrypts the encrypted secret with the encrypted signature to obtain the secret. In one embodiment, the program code further includes: program code for determining the signature of the first code; program code for encrypting the signature with the key to obtain an encrypted signature; and program code for encrypting the secret with the encrypted signature to obtain the encrypted secret. In another embodiment, the program code further includes program code for authenticating the first code. The instructions of the program code may include: determining the signature of the first code using a code-signing key; comparing the signature to an expected value for the signature; and executing the first code if the signature equals the expected value.

The following detailed description together with the accompanying drawings will provide a better understanding of the nature and advantages of the present invention.

DETAILED DESCRIPTION OF THE INVENTION

Embodiments of the present invention provide methods, devices, and systems of securely giving a processor executing code access to a secret while it is executing that code. For ease of presentation, the code is described herein as being given access to the secret. (More generally, it is to be understood that any actions described herein as being performed by "code" may be performed by a processor executing the code.) The secret may be a key used in encryption, a simple message, or any information to which access is wished to be restricted. In some instances, an encrypted form of the secret is passed directly from one code to another; and in other instances, the encrypted secret is stored such that a code running on a processor can retrieve the encrypted secret. Although embodiments describe code running on a graphics processing unit (GPU), the code accessing the secret may run on any processor.

Figure 1:
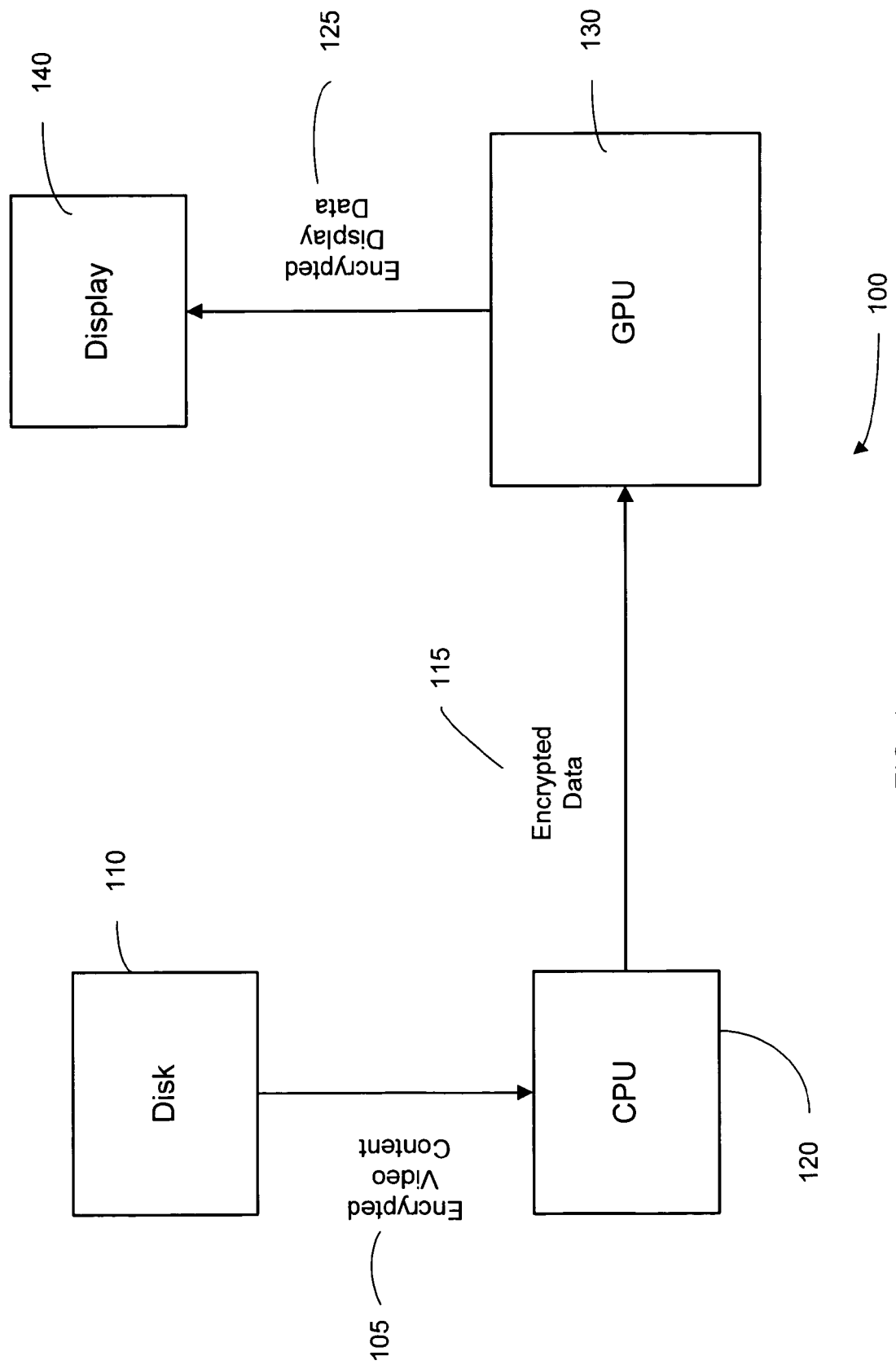
FIG. 1 illustrates a video system for displaying video content according to an embodiment of the present invention.

FIG. 1 shows a video system 100 for displaying video content according to an embodiment of the present invention. A central processing unit (CPU) 120 reads encrypted video content 105 from disk 110. CPU 120 may decrypt content 105 in order to process the data. CPU 120 then negotiates a key with a GPU 130 and uses the negotiated key to send encrypted (or re-encrypted) data 115 to GPU 130. GPU 130 decrypts encrypted data 115, as it needs to process the unencrypted data stream in order to determine pixel data to be displayed.

Video system 100 is illustrative and may be modified or varied. For instance, video system 100 can be implemented in a computer system of generally conventional design, with a DVD drive or other device supplying encrypted video data from a source medium (such as a disk). In some embodiments, system 100 may include a network adapter via which system 100 can receive encrypted content from a remote source (e.g., via the Internet or other network). In other embodiments, CPU 120 is not required and encrypted video content 105 can flow directly from disk 110 to GPU 130. (For instance, GPU 130 might be included in a DVD player that might have an integrated display or connection ports for connecting to a display device.) In other embodiments, GPU 130 performs audio processing and sends an encrypted audio data stream to a receiver, speaker or other suitable audio output device in addition to or instead of sending pixel data to a display to a display.

After the pixel data has been determined, GPU 130 encrypts the pixel data to obtain encrypted display data 125, which is sent to a display 140, e.g., using a DVI or HDMI connection or other connections known in the art. Display 140 decrypts data 125 and displays the decrypted pixel data as a viewable image.

Encrypted display data 125 results from an encryption using a display key $K_D$, which should be kept secret in order to prevent unauthorized access to the decrypted pixel data. In some embodiments, GPU 130 sends $K_D$ to display 140, e.g., according to secure transmission methods known in the art. In other embodiments, display 140 maintains a copy of $K_D$ and thus $K_D$ need not be sent. So that GPU 130 can utilize $K_D$ in the encryption process, $K_D$ is stored in a protected form somewhere that is accessible by GPU 130. So that a compromise of $K_D$ cannot be used to access decrypted pixel data in other systems, the value of $K_D$ may be different for every GPU. Also, as another layer of security, any code that can access $K_D$ may be required to be authenticated before the code is allowed to run on a secure processor. The description of a GPU with a secure processor and an authentication process follows.

Figure 2:
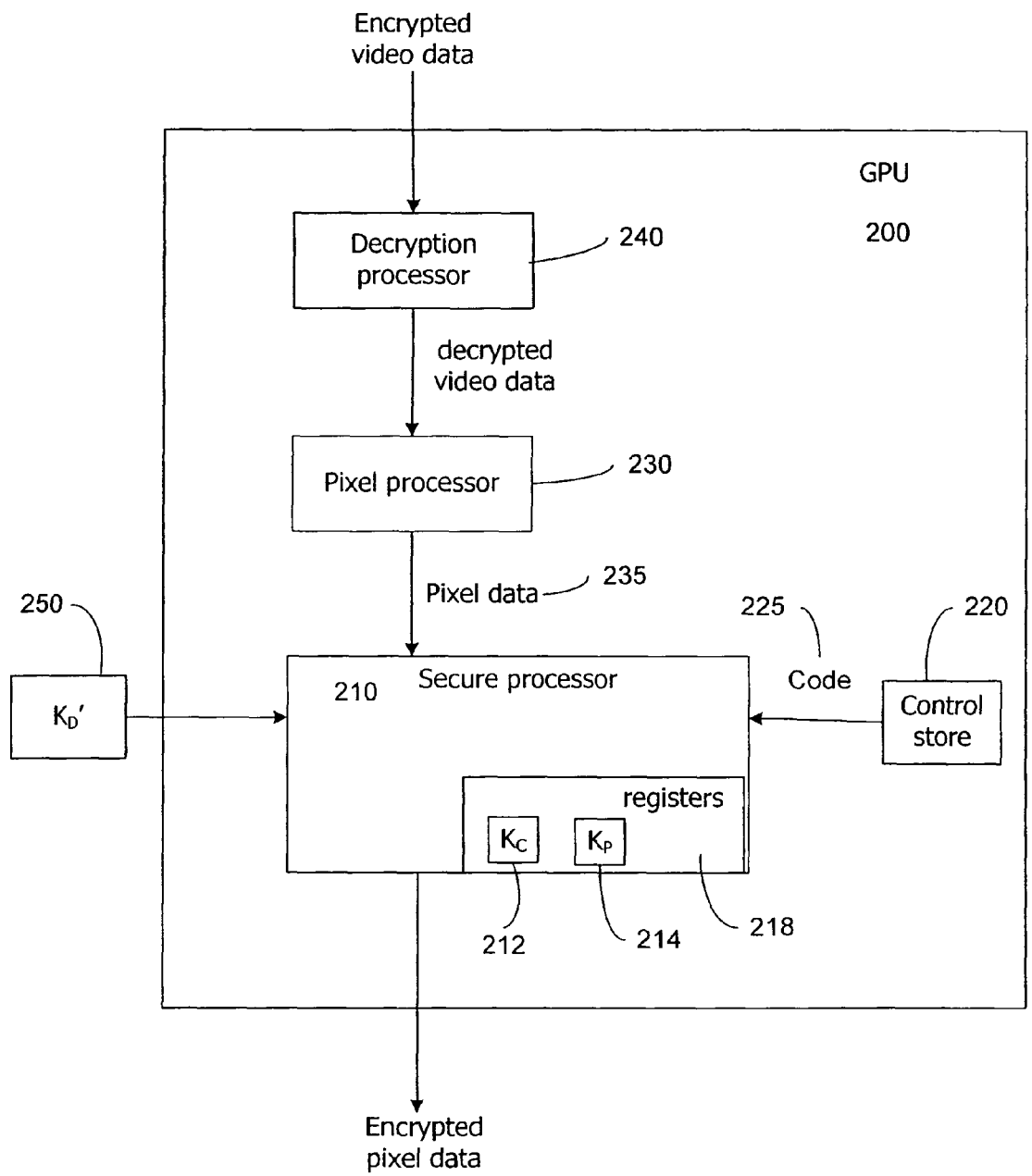
FIG. 2 illustrates a GPU having a secure processor according to an embodiment of the present invention.

FIG. 2 illustrates a GPU 200 having a secure processor 210 according to an embodiment of the present invention. GPU 200 receives encrypted video data (e.g., from CPU 120 as per FIG. 1). Decryption processor 240 decrypts the encrypted video data using a decryption key negotiated with CPU 120 (or other source) to obtain decrypted video data. Pixel processor 230 receives the decrypted video data and generates pixel data 235 in cleartext form. Pixel processor 230 and decryption processor 240 may be different processors or the same processor, which is configured with different program code. Decrypting the video data & generating pixel data 235 can be implemented using conventional techniques. These operations are not critical to the present invention and a detailed description has been omitted.

In one embodiment, secure processor 210, which may be internal to GPU 200 or external, encrypts pixel data 235 using $K_D$ & sends encrypted pixel data (e.g. encrypted display data 125) to a display device, such as display 140. In another embodiment, secure processor 210 sends $K_D$ to another device, such as a display controller, which could then encrypt pixel data 235. Secure processor 210 is controlled by one or more codes stored in control store 220. In one embodiment, code 225 contains instructions for obtaining $K_D$ and/or for encrypting pixel data 235. In one embodiment, code 225 in control store 220 is firmware or part of firmware that can be updated from time to time.

In order to encrypt pixel data 235, secure processor 210 must have access to the display key $K_D$. It is desirable to make sure that secure processor 210 does not execute any code that exposes $K_D$ or any information from which $K_D$ could be determined. Embodiments of the present invention provide protection for $K_D$, e.g., from malicious code.

In some embodiments to prevent malicious code from being executed, secure processor 210 only runs code that has been properly authenticated, e.g. using a cryptographic message authentication code (MAC). A MAC algorithm accepts as input a secret key ($K_C$), referred to herein as a "code-signing key," and an arbitrary-length message (e.g., program code) to be authenticated, and outputs a MAC, referred to herein as a signature or Sig. The program code and its signature are both provided to secure processor 210, which also possesses the code-signing key $K_C$.

The MAC value protects both the code's integrity and its authenticity, by allowing secure processor 210 to detect any changes to the message content. For example, secure processor 210 can use $K_C$ to compute the signature for the program code and compare the computed signature to the original signature that accompanied the code. If changes have been made to the code after the original signature was computed, the code would not be verified (authenticated) and is advantageously not allowed to run on secure processor 210.

In one embodiment, $K_C$ is a "universal" code-signing key. It is universal in that many GPUs use the same $K_C$ to authenticate code. A universal code-signing key has the benefit that software code signed with the universal code-signing key can be authenticated by any of the GPUs using the universal code-signing key, and the code does not have to be separately signed for each GPU. Thus, signed code (such as a firmware update) may be made available for use by many GPUs, e.g., via Internet download. The term "universal" still allows other GPUs to use a different "universal" code-signing key, e.g., a next generation of GPU could use a different universal code-signing key.

A reason for requiring authentication of code is that secure processor 210 is able to access secret values (e.g., $K_D$) that other code running on the GPU (e.g., code running in pixel processor) cannot. To keep these secret values safe, the value of $K_C$ should be secret as well. Thus, in one embodiment, block 212 that stores $K_C$ is a secure register of a register block 218, which may include secure and non-secure registers.

Secure registers have access control lists (ACLs) that can be hardwired or modifiable by authenticated code. The ACLs include "readable," "writeable," "keyable," and "signature-only keyable" access modes for each register. "Readable" means that authenticated code can instruct the processor to read from the register; "writeable" means that authenticated code can instruct the processor to write to the register; "keyable" means that authenticated code can only instruct the processor to use the content of the register as a key of a cryptographic function, e.g., through a hardwired function call; and "signature-only keyable" means the register can only be used as the key for encrypting the signature of the code that is accessing the register.

Accordingly, $K_C$ may have only keyable access. In one embodiment, $K_C$ is hardwired into block 212 in GPU 200, e.g., within secure processor 210, so that it is unalterable and permanent, such as in a fuse.

Figure 3:
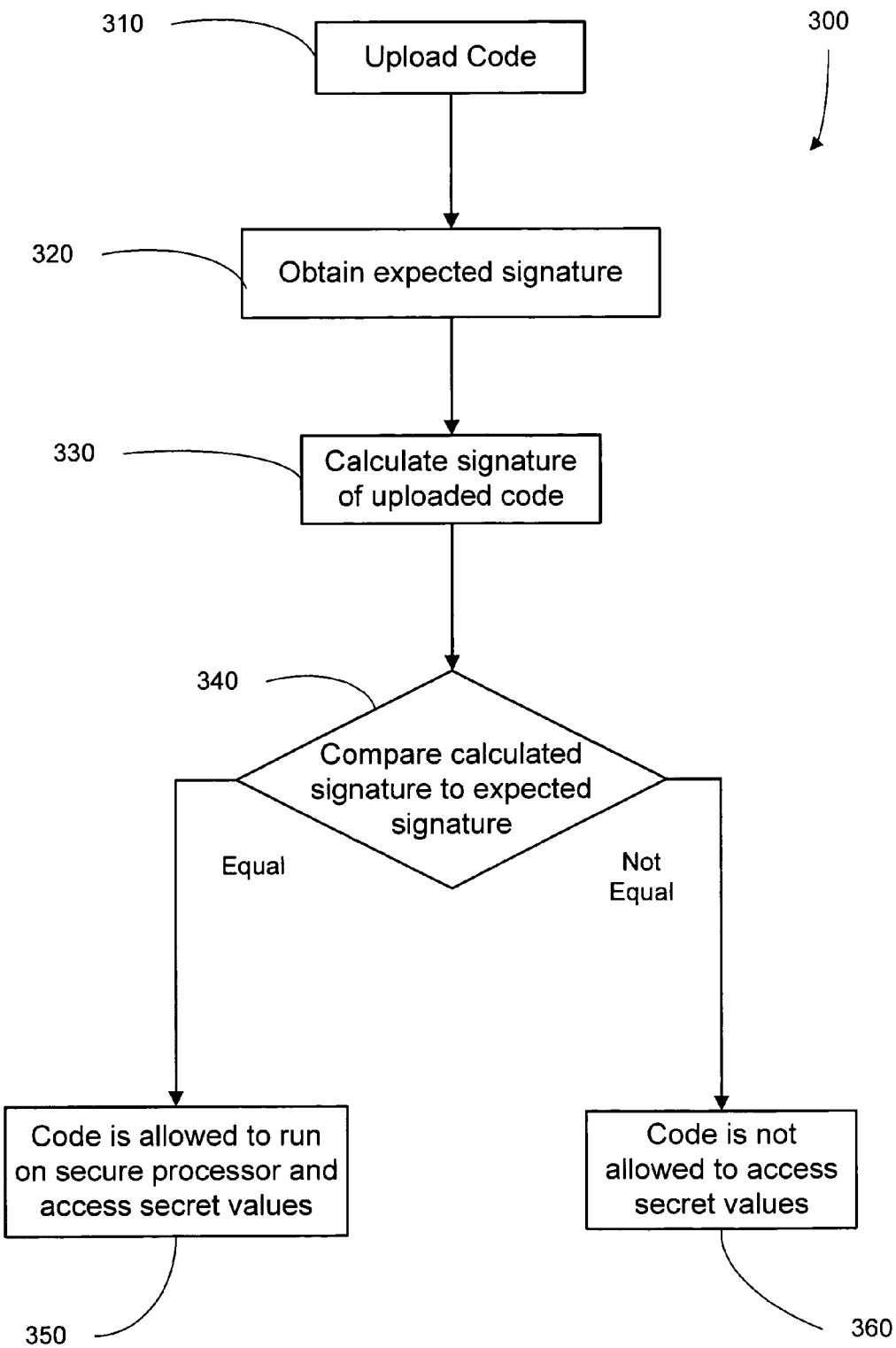
FIG. 3 is a flow diagram of a method of authenticating code according to an embodiment of the present invention.

FIG. 3 is a flow diagram of a method of authenticating code according to an embodiment of the present invention. In step 310, code is uploaded to secure processor 210, for example from a control store 220. In step 320, the expected value for the signature of the code is obtained. In one embodiment, the signature of the code is stored in the same block of data as the code itself. In one aspect, the signature is stored within a code when access to the signatures is to be restricted. In another embodiment, the signature is stored separately and is retrieved in a separate process. The signature may be of any appropriate length, such as 128 bit.

In step 330, secure processor 210 calculates the signature of the code with a MAC function using $K_C$ as an input. In step 340, secure processor 210 compares the expected signature to the calculated signature. In one embodiment, the instructions for calculating the signature of the code and comparing the expected signature to the calculated signature are hardwired into logic of secure processor 210 to prevent malicious code from modifying the verification process. In another embodiment, logic of secure processor is programmed with software to implement method 300.

In step 350, if the result of the comparison of step 340 signifies that the two values are equal then the code has been authenticated and can access secret information, such as information within secure registers of register block 218. In one embodiment, the signature of the authenticated code is stored within a secured register of secure processor 210 with readable access. If the two values match, the code can be marked as valid; a secure signature register is assigned to the value of the code's signature; and this register is marked as valid.

In step 360, if the two signature values differ, then the code cannot access the secret information. In some embodiments, the non-authenticated code is prevented from running. In other embodiments, the non-authenticated code can be executed but is prevented from accessing the secured registers of the secure processor 210 or modifying the registers' ACLs.

In one aspect, to increase the efficacy of preventing malicious code from gaining access to secrets, the code-signing algorithm satisfies the following property: given the signing key $K_C$ and a legitimate microcode M, it must be computationally hard to create a malicious microcode M' such that M != M' but $MAC(K_C, M) = MAC(K_C, M')$. Such requirements are known to one skilled in the art. For example, cipher-based message authentication code (CMAC) may be used with a one-way cryptographic hash function, e.g. SHA-256, or a keyed-hash message authentication code (HMAC) may be used.

After a code has been authenticated, the code can access the secure registers as specified by the ACLs. In one embodiment, if $K_D$ is stored in one of the secure registers with read access, the authenticated code could then read $K_D$, use $K_D$ to encrypt pixel data 235, and send encrypted pixel data to display 140. However, if $K_C$ was compromised, then malicious, but authenticated, code could have easy access to $K_D$. For example, the malicious code could read $K_D$ from a secure register and output it to an output port of GPU 200. This could be done, for example, in cases where another device in GPU 200 encrypts pixel data 235 or secure processor 210 does the encrypting. If $K_C$ is a universal key, then a compromise of $K_C$ would compromise all display keys $K_D$, even if each GPU had a different $K_D$.

In another embodiment, to protect access to $K_D$, further measures are advantageously employed. In one embodiment, where secure processor 210 encrypts pixel data 235, access to $K_D$ can be restricted to a function call that produces encrypted data based on an input of unencrypted data, e.g., with a keyable access mode. Thus, if $K_D$ can be kept within a register to which access is restricted to using the register contents as a key to encrypt data, $K_D$ is not easily compromised when $K_C$ is. This restricted access can be controlled by the register's ACL, which can be hardwired to prevent the access restrictions of $K_D$ from changing. $K_D$ itself may be hardwired as well, e.g., using fuses.

Although $K_D$ can be protected in the above manner by storing $K_D$ as hardwired data in a keyable secured register, it may be desirable to provide more flexibility. For example, for ease of manufacturing, it can be beneficial to be able to provide $K_D$, or at least an encrypted form of $K_D$, after the GPU has been created. Thus, in one embodiment, $K_D$ is stored in an off-chip storage element 250, such as a ROM. In one aspect, the contents of storage element 250 are publicly accessible. In other embodiments, $K_D$ resides on the GPU in a publicly accessible location.

In an embodiment, where $K_D$ is (or could become) publicly accessible, the value of $K_D$ is advantageously not stored directly, but is encrypted before being stored in a protected (e.g., encrypted) form as $K_D'$. Otherwise, $K_D$ could be easily compromised by reading it from its publicly accessible storage location. $K_D$, however, must be provided to secure processor as cleartext for use in encrypting pixel data 235. Thus, another way that $K_D$ could be compromised is by providing secure processor with malicious code that outputs $K_D$ or other data from which $K_D$ can be extracted.

In one embodiment, the encryption of $K_D$ utilizes a private key $K_P$ that is known to secure processor 210. $K_P$ may be protected by storing it within secure register 214. The encrypted value ($K_D'$) of $K_D$ can be stored in memory element 250. If $K_P$ were used to encrypt $K_D$ directly, secure processor 210 would then read out $K_D'$ and decrypt $K_D'$ with $K_P$ to obtain $K_D$. However, if $K_C$ was compromised, malicious code could access $K_P$ and use it to decrypt $K_D$, even if $K_P$ were different for every GPU 200. Access to $K_P$ could be restricted to a function call that only decrypts $K_D$, but this is still vulnerable. Malicious code could still use this function call to decrypt $K_D'$, and output $K_D$.

To prevent malicious code from outputting $K_D$, embodiments of the invention use a signature of the code that is to access and decrypt $K_D'$ in the encryption process from which $K_D'$ is obtained. In other words, the decryption key of an encrypted secret $K_D'$ is a function of the code that decrypts $K_D'$. Thus, embodiments of the invention prevent altering of the code that can decrypt $K_D'$. For example, if the code is changed to output $K_D$, then the code's signature will change and the attempted decryption process will produce a result that is not $K_D$.

Some embodiments also allow $K_P$ to be used only to encrypt a signature of the code that accesses $K_P$. To ensure better security, the encryption of $K_D$ can be different for every chip, e.g., each chip can have a different $K_P$. Even if $K_P$ for a particular chip is discovered, only that chip's $K_D$ can be decrypted. Such a procedure would also benefit embodiments where $K_D$ is stored in a keyable register since malicious code could use $K_D$ as an oracle to decrypt an encrypted video stream.

Figure 4:
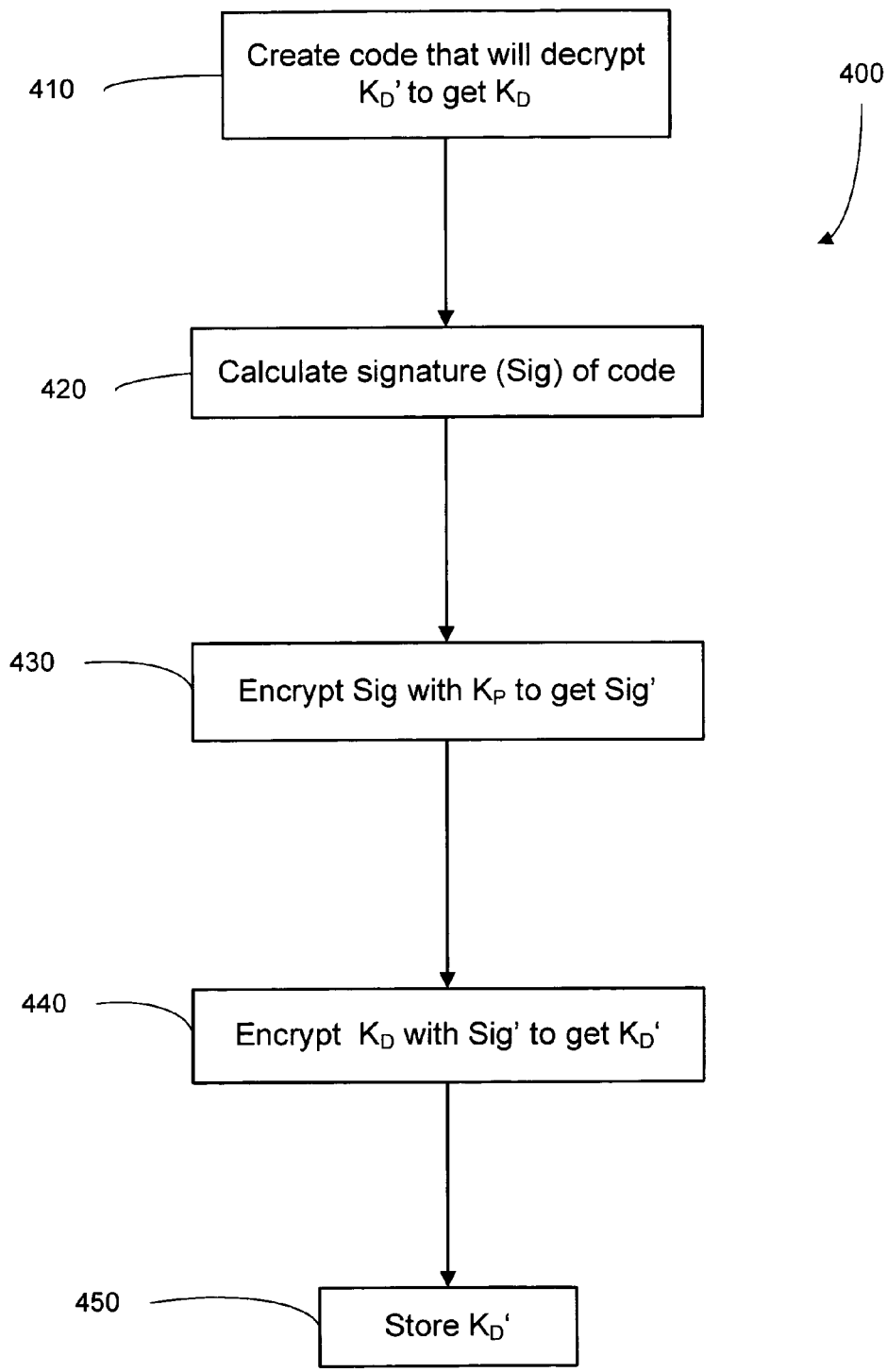
FIG. 4 is a flow diagram of a method of encrypting a secret according to an embodiment of the present invention.

FIG. 4 is a flow diagram of a method for encrypting a secret, such as $K_D$, according to an embodiment of the present invention. In one aspect, access to the secret is only granted to a code that has a specific signature, e.g., code 225 that facilitates the encryption of pixel data 235. In step 410, code is created that will retrieve $K_D'$ and decrypt $K_D'$ to obtain $K_D$. In step 420, the signature (Sig) of the code is calculated using $K_C$. The signature may be calculated using any function, e.g., a MAC, cryptographic hash function or other cryptographic algorithms, such that the signatures for any two different sets of codes are different to a high degree of probability.

As an illustration, the legitimate microcode is already fixed, and the adversary must find a different microcode (2nd pre-image attack) whose signature collides with that of the legitimate microcode. Assuming the underlying MAC and hash function are secure, the resources needed by 2nd pre-image attack grows linearly with the smaller of the two numbers, (1) the size of the image space of the hash function, and (2) the size of the key space of the MAC. For example, when using SHA-256 with an AES-128 based MAC, then the cost is roughly $2^{128}$. In such an instance, SHA-256 doesn't provide more security, and it can reasonably be replaced with an AES-128 based DM hash.

In step 430, Sig is encrypted using $K_P$ to obtain Sig', i.e. Sig'=E($K_P$, Sig), where E signifies the encryption of Sig with the key K. In step 440, $K_D$ is encrypted using Sig' as the key to obtain $K_D'$, i.e. $K_D'$=E(Sig', $K_D$). In step 450, $K_D'$ is stored, e.g. in memory element 250. These steps may be performed prior to or during the manufacturing of a system that decrypts the secret. Thus, these steps may be performed, e.g., by a processor that is in the possession of a manufacturer and different from the GPU (or other processor) that is put into a consumer device. Conventional encryption techniques such as Advanced Encryption Standard (AES) may be used.

In one embodiment, when $K_D$ is needed to encrypt pixel data 235 to provide encrypted pixel data, code 225 on secure processor 210 can retrieve $K_D'$, decrypt $K_D'$, and send decrypted $K_D$ to another device if needed. Since only code 225 can decrypt $K_D'$, the access to $K_D$ is controlled. The decryption of $K_D'$ may be performed as follows.

Figure 5:
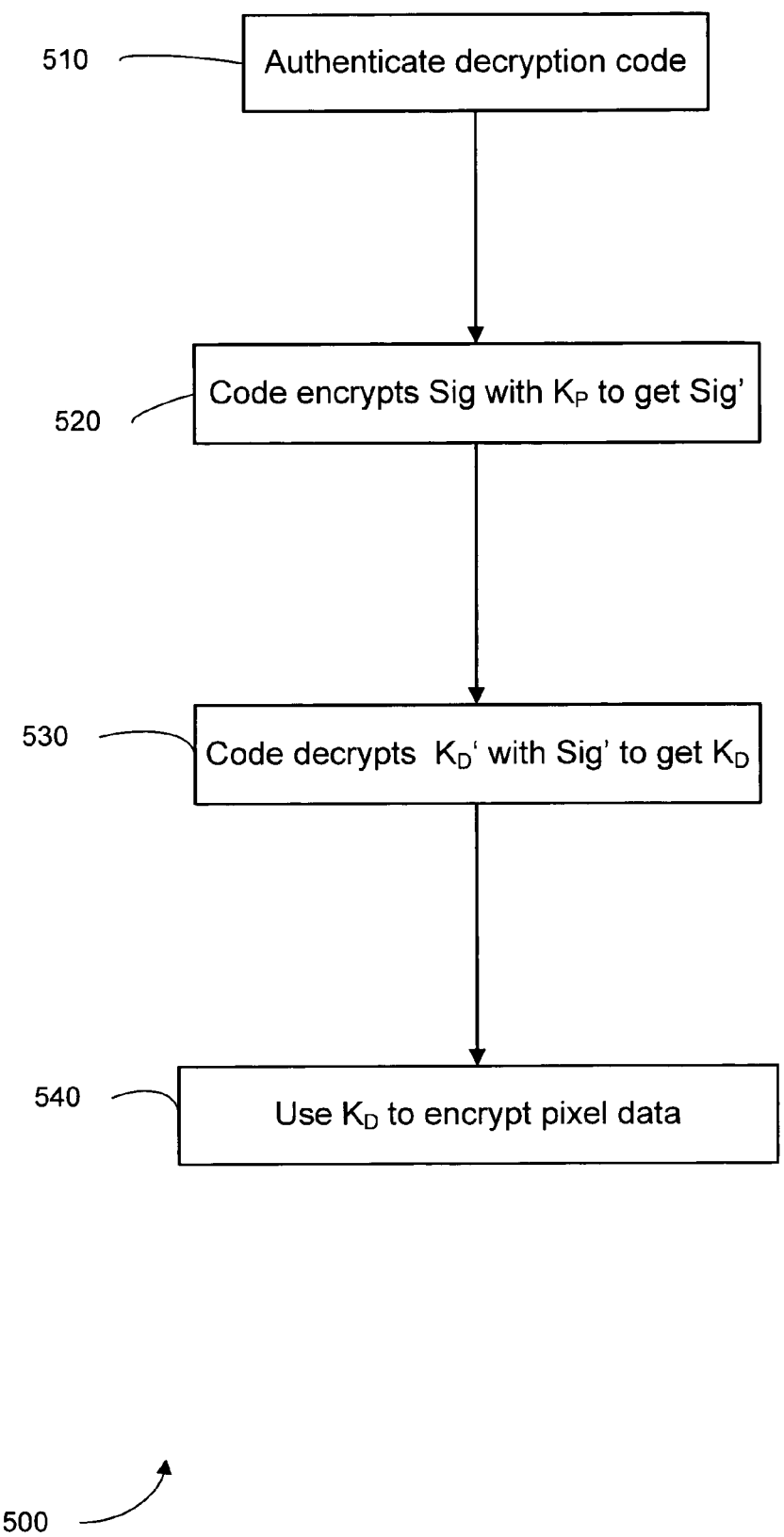
FIG. 5 is a flow diagram of a method of decrypting an encrypted secret by a code with a specific signature according to an embodiment of the present invention.

FIG. 5 is a flow diagram of a method 500 of decrypting an encrypted secret, such as $K_D'$, and using the decrypted secret to encrypt data according to an embodiment of the present invention. In one aspect, method 500 decrypts the encrypted secret only when the code for decrypting has a specific signature; therefore, only specified actions are allowed, which secures the decrypted secret $K_D$. In one embodiment, method 500 is performed by GPU 130 of system 100.

In step 510, decryption code is authenticated by calculating its signature and comparing it to the expected signature of the decryption code. If the signatures match, the calculated signature (Sig) is then stored, e.g. in a signature register. In step 520, the code encrypts Sig using $K_P$ to obtain Sig', i.e. Sig'=E($K_P$, Sig). In one embodiment, an Encrypt_Sig function call is used, which may be a hardware or software function. In one aspect, this is the only access allowed to $K_P$, which has signature-only keyable access.

Encrypt_Sig can obtain Sig from the signature register of the code calling Encrypt_Sig. In one embodiment, access to Sig' is restricted to being used in a subsequent encryption or decryption process. For example, in one embodiment, once Sig' is calculated, it may automatically be stored in a secured register that is only keyable.

In step 530, the code decrypts $K_D'$ with Sig' to obtain $K_D$, i.e. $K_D$=D(Sig', $K_D'$), where D is a hardware decrypt of with key Sig'. In step 540, $K_D$ is used to encrypt pixel data 230, for example, by secure processor 210. In one aspect, the code sends $K_D$ over an internal bus to a display controller, which has hard-wired logic that uses $K_D$ to encrypt pixel data 230.

Accordingly, since the signature (Sig) of the code is used to encrypt $K_P$ via Sig', if the code is altered, e.g. to output a secret, then the signature of that code will be different and Sig' will be different. Thus, with a different Sig', the decryption process D(Sig', $K_D'$) will provide an incorrect $K_D$.

In other words, the Encrypt_Sig function grants conditional access to a secret key for fulfillment of only a single authorized purpose. Subversion of the purpose (i.e. meddling with the code that fulfills the specific intended purpose) causes the code signature, and therefore the derived secret key value to which Encrypt_Sig grants access, to change. Thus, the access to the secret key is denied if the authorized purpose is subverted.

In theory, if $K_C$ was known, $K_P$ could be compromised. For example, the signature of any microcode could be calculated. Authentic (i.e., properly signed using KO microcode could then be written so as to call Encrypt_Sig and output Sig'. From the text (Sig) and ciphertext (Sig'), $K_P$ could be determined. Accordingly, the encryption process, such as Advanced Encryption Standard (AES), is advantageously selected such that the determination of a key is extremely hard and time consuming given the text and the ciphertext.

Further, even if $K_P$ were discovered through a very laborious effort, $K_P$ would be useful for decrypting $K_D'$, thus obtaining $K_D$, for only one GPU as long as each GPU has a different $K_P$. The laborious effort to discover $K_P$ on one GPU would have to be repeated for each GPU. Thus, a GPU is compromised only if the $K_P$ of that particular GPU is compromised.

Further protection is achieved by preventing malicious code from using the signature of other code. If a code had access to another signature, then the Encypt_Sig command could be used with a different signature than the one calling it. For example, if one code calls another code, effectively transferring control, then such a control shift could be exploited to obtain the secret.

In one embodiment, to prevent an exploit in which program control falls through to code which was previously authenticated using a different signature, the processor can invalidate the signature of authenticated code via a Forget_Sig instruction. The processor may use a special register to hold the signature that is marked as valid upon successful code authentication. In one aspect, the Forget_Sig instruction invalidates this signature register, which means that if code later tries to call the Encrypt_Sig instruction it will fail (with an error) since the signature is no longer valid. In another aspect, the Forget_Sig instruction removes or deletes the signature from a signature register.

The processor may ensure that the control of the authentic code may not branch out of the authentic code before the Forget_Sig instruction has been issued. Thus, in one aspect, Encrypt_Sig and Forget_Sig are called in pairs so that the value of Sig' is not accessible outside of the authenticated code. The code to which Sig' belongs also clears the register containing Sig', as well as calling Forget_Sig. Forget_Sig enforces that a different code may not call Encrypt_Sig as though it were the first code, thus preventing malicious code from producing the first code's Sig' itself via Encrypt_Sig. Forget_Sig is directed to embodiments where the processor does not require authentication of a code each time the code is called. In another embodiment, code is required to be authenticated each time control is transferred to that code.

Embodiments of the methods 400 and 500 of encrypting and decrypting can also be used to securely pass a secret between a first code and a second code while preventing a third code from accessing the secret. Thus, a secret may be securely shared even in instances where the encrypted secret is publicly accessible and the code-signing key has been discovered. In some embodiments, the first and second codes are run on the same processor, and may be run concurrently.

Figure 6:
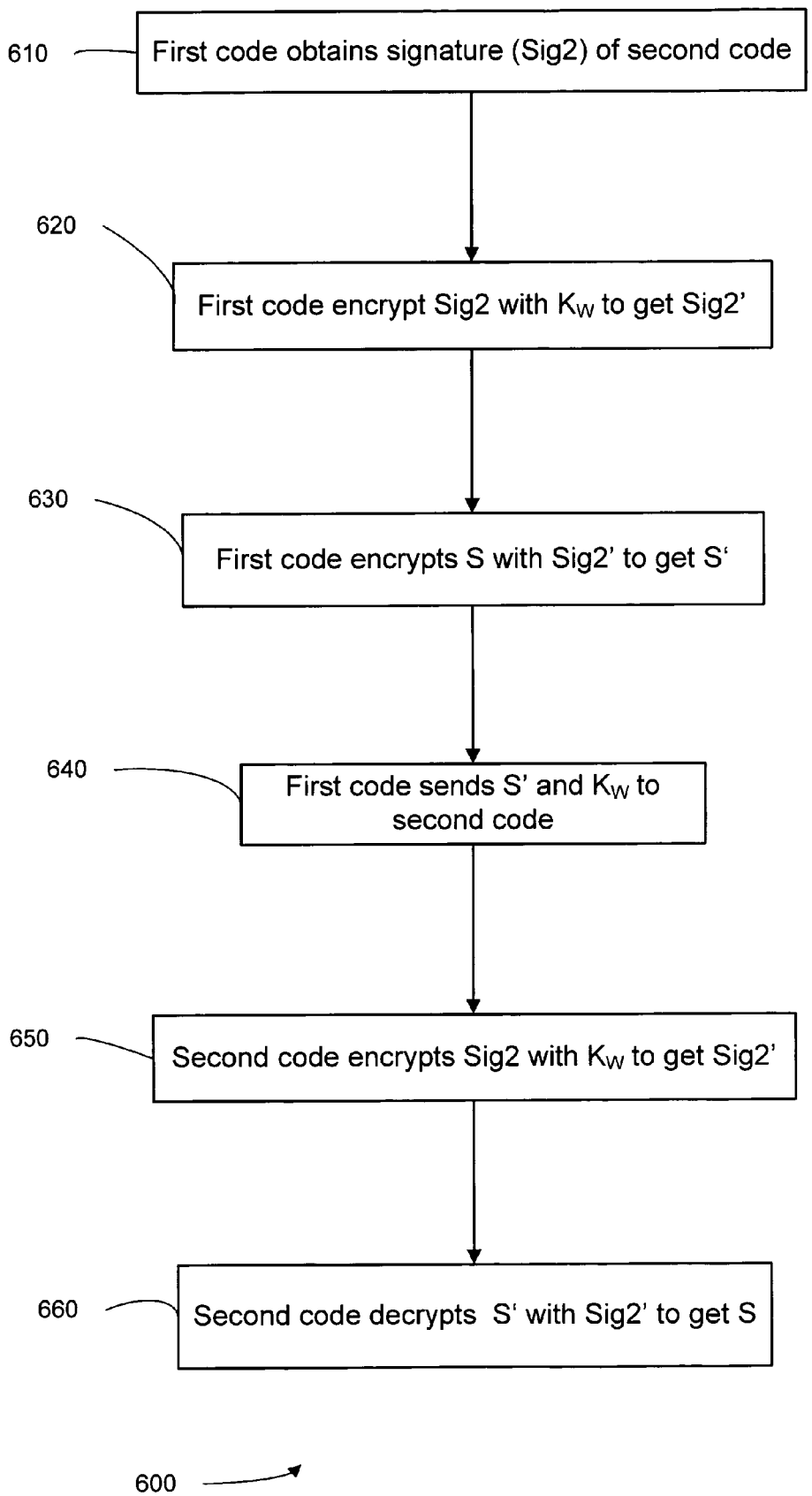
FIG. 6 is a flow diagram of a method of sharing a secret between codes.

FIG. 6 illustrates a method 600 for sharing a secret between codes. In step 610, a first code obtains the signature (Sig2) of a second code that is usable to decrypt an encrypted secret S'. In one aspect, Sig2 is stored with the first code, and thus when the first code is running it has access to Sig2. In another aspect, Sig2 is stored separately from the first code, but Sig2 is still accessible to the first code. Sig2 may be publicly accessible.

In step 620, the first code encrypts Sig2 with $K_W$ to obtain Sig2'. In one aspect, $K_W$ does not have the same access restrictions as $K_P$. $K_W$ may be keyable to the normal AES encrypt function and therefore can be used to encrypt data other than a code's signature. $K_W$ may be unique to the first code.

In step 630, the first code encrypts a secret (S) with Sig2' to obtain S'. In step 640, the first code sends S' and $K_W$ to the second code. In one embodiment, the first code stores S' in a publicly accessible memory element, such as a register. In another embodiment, the first code could also transmit S' over a communication path to a computing system that hosts the second code, which may be the same computing system. The second code may then begin running and read S'. Alternatively, the second code may have previously been running and receive S' over a communication line.

In one embodiment, the first code passes $K_W$ to the second code by placing $K_W$ in a register with ACL such that the only way the second code may use this register is as a key to the Encrypt_Sig function. Thus, the only code that can use $K_W$ to produce Sig2" is the code with signature Sig2. In step 650, the second code encrypts Sig2 with $K_W$ to get Sig2'. In step 660, the second code decrypts S' with Sig' to get S.

Figure 7:
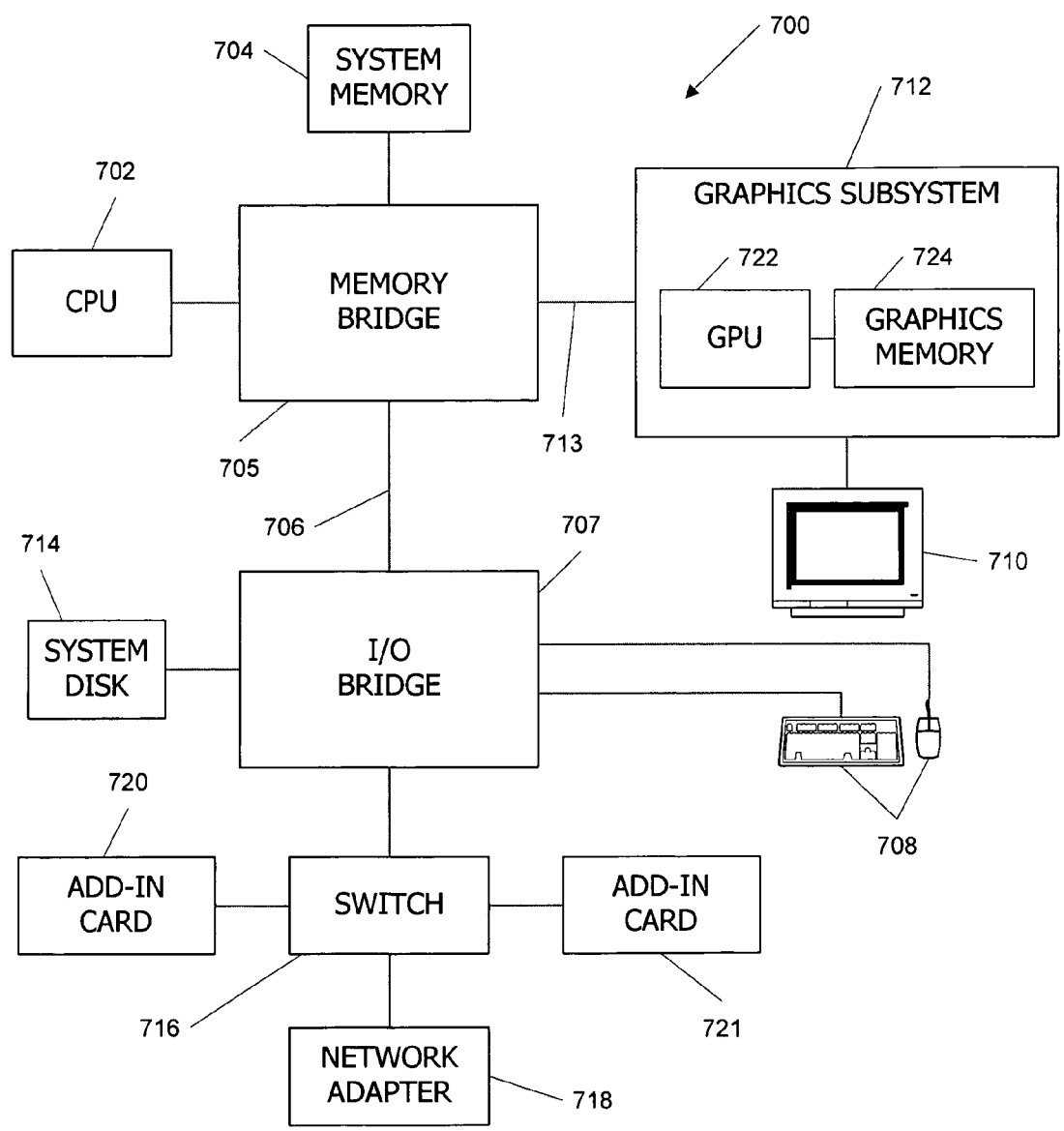
FIG. 7 is a block diagram of a computer system according to an embodiment of the present invention.

FIG. 7 is a block diagram of a computer system 700 according to an embodiment of the present invention. Computer system 700 includes a central processing unit (CPU) 702 and a system memory 704 communicating via a bus path that includes a memory bridge 705. Memory bridge 705, which may be, e.g., a conventional Northbridge chip, is connected via a bus or other communication path 706 (e.g., a HyperTransport link) to an I/O (input/output) bridge 707. I/O bridge 707, which may be, e.g., a conventional Southbridge chip, receives user input from one or more user input devices 708 (e.g., keyboard, mouse) and forwards the input to CPU 702 via bus 706 and memory bridge 705. Visual output is provided on a pixel based display device 710 (e.g., a conventional CRT or LCD based monitor) operating under control of a graphics subsystem 712 coupled to memory bridge 705 via a bus or other communication path 713, e.g., a PCI Express (PCI-E) or Accelerated Graphics Port (AGP) link. A system disk 714 is also connected to I/O bridge 707. A switch 716 provides connections between I/O bridge 707 and other components such as a network adapter 718 and various add-in cards 720, 721. Other components (not explicitly shown), including USB or other port connections, CD drives, DVD drives, and the like, may also be connected to I/O bridge 707. Bus connections among the various components may be implemented using bus protocols such as PCI (Peripheral Component Interconnect), PCI-E, AGP, HyperTransport, or any other bus or point-to-point communication protocol(s), and connections between different devices may use different protocols as is known in the art.

Graphics processing subsystem 712 includes a graphics processing unit (GPU) 722 and a graphics memory 724, which may be implemented, e.g., using one or more integrated circuit devices such as programmable processors, application specific integrated circuits (ASICs), and memory devices. GPU 722 may be configured to perform various tasks related to generating pixel data from graphics data supplied by CPU 702 and/or system memory 704 via memory bridge 705 and bus 713, interacting with graphics memory 724 to store and update pixel data, and the like. For example, GPU 722 may include a rendering pipeline that generates pixel data from 2-D or 3-D scene data provided by various programs executing on CPU 702. GPU 722 may also store pixel data received via memory bridge 705 to graphics memory 724 with or without further processing. GPU 722 may also include a scanout module configured to deliver pixel data from graphics memory 724 to display device 710.

CPU 702 operates as the master processor of system 700, controlling and coordinating operations of other system components. In particular, CPU 702 issues commands that control the operation of GPU 722. In some embodiments, CPU 702 writes a stream of commands for GPU 722 to a command buffer, which may be in system memory 704, graphics memory 724, or another storage location accessible to both CPU 702 and GPU 722. GPU 722 reads the command stream from the command buffer and executes commands asynchronously with operation of CPU 702. The commands may include conventional rendering commands for generating images as well as general-purpose computation commands that enable applications executing on CPU 702 to leverage the computational power of GPU 722 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 704 is connected to CPU 702 directly rather than through a bridge, and other devices communicate with system memory 704 via memory bridge 705 and CPU 702. In other alternative topologies, graphics subsystem 712 is connected to I/O bridge 707 rather than to memory bridge 705. In still other embodiments, I/O bridge 707 and memory bridge 705 might be integrated into a single chip. The particular components shown herein are optional; for instance, any number of add-in cards or peripheral devices might be supported. In some embodiments, switch 716 is eliminated, and network adapter 718 and add-in cards 720, 721 connect directly to I/O bridge 707.

The connection of GPU 722 to the rest of system 700 may also be varied. In some embodiments, graphics system 712 is implemented as an add-in card that can be inserted into an expansion slot of system 700. In other embodiments, a GPU is integrated on a single chip with a bus bridge, such as memory bridge 705 or I/O bridge 707.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 713. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, embedded systems and so on.

It is also to be understood that that aspects of the present invention can be practiced in any context where secret information is to be provided to a processor.

Embodiments of the present invention can be implemented in the form of control logic in software or hardware or a combination of both. For example, the control logic may be stored in an information storage medium as a plurality of instructions adapted to direct an information processing device to perform a set of steps disclosed in embodiment of the present invention, or may be stored in a computer program product including a computer readable medium encoded with program code for controlling operation of a computer system.

While the invention has been described by way of example and in terms of the specific embodiments, it is to be understood that the invention is not limited to the disclosed embodiments. To the contrary, it is intended to cover various modifications and alternatives, in addition to those described above, as would be apparent to those skilled in the art. Therefore, the scope of the appended claims should be understood as encompassing all such modifications and alternatives.

What is claimed is:

1. A method of protecting a secret, the method comprising: determining a signature of a first code that is usable to obtain the secret; encrypting the signature using a first key to obtain an encrypted signature; encrypting the secret, using the encrypted signature as a second key, to obtain the encrypted secret; and providing the encrypted secret to a processor configured to execute the first code to decrypt the encrypted secret; prior to executing the first code to obtain the secret: authenticating the first code by: determining the signature of the first code using a code-signing key; and comparing the signature to an expected value for the signature; and executing the first code only if the signature equals the expected value.

2. The method of claim 1 wherein encrypting the signature of the first code with the first key and encrypting the secret with the encrypted signature are performed by a second code, and wherein providing the encrypted secret to the processor comprises transmitting the encrypted secret from the second code to the first code, and further comprising providing the first key to the first code.

3. The method of claim 2 wherein providing the first key to the first code comprises placing the first key in a register that has restricted access such that the first code may only use this register as a key to encrypt the signature of the first code.

4. The method of claim 2 wherein the second code has keyable access to the first key such that the second code can only instruct the processor to use the first key as a key of a cryptographic function.

5. The method of claim 1 wherein providing the encrypted secret to the processor comprises storing the encrypted secret on a system, wherein the system includes the processor, wherein the first key and the secret are specific to that system.

6. The method of claim 1 further comprising executing the first code to obtain the secret by:
encrypting the signature using the first key to obtain the encrypted signature; and
decrypting the encrypted secret using the encrypted signature as a key.

7. the method of claim 1, wherein the code-signing key is a universal key.

8. the method of claim 1, further comprising: placing the signature into a register reserved for a signature value; and invalidating the signature from the register when the first code is not executed.

9. The method of claim 1, further comprising: placing the signature from the register by the first code explicitly invoking a hardwired function of the secure processor at any time during the execution of the first code.

10. The method of claim 1 wherein the secret is a display key for encrypting data to be sent to a display.

11. The method of claim 1 wherein the encrypted secret is publicly accessible.

12. A system for protecting a secret, the system comprising:
a memory element that stores an encrypted secret;
a processing unit including a secure processor; and
a control store communicably coupled to the processing unit and storing a first code executable by the secure processor,
wherein the secure processor includes logic adapted to determine a signature of the first code, and
wherein the first code includes:
code instructing the secure processor to encrypt the signature using a first key to obtain an encrypted signature; and code instructing the secure processor to decrypt the encrypted secret using the encrypted signature as a key.

13. The system of claim 12 wherein the code instructing the secure processor to encrypt the signature includes code invoking a hardwired function of the secure processor that encrypts a signature of a code that calls the hardwired function, wherein the secure processor is configured to encrypt the signature of the first code only when the hardwired function is called from within the first code, and wherein the first key is accessible only to encrypt a signature of a code invoking the hardwired function.

14. The system of claim 13 wherein the first code has keyable access to the encrypted signature such that the first code can only instruct the processor to use the encrypted signature as a key of a cryptographic function.

15. The system of claim 12 wherein the logic to determine a signature of the first code includes a hardwired function of the secure processor that:
   determines the signature of the first code using a code-signing algorithm that uses a code-signing key;
   compares the signature to an expected value for the signature; and
   executes the first code only if the signature equals the expected value.

16. The system of claim 12 wherein the first key and the secret are specific to the system.

17. The system of claim 12 wherein the memory element resides off-chip from the processing unit.

18. The system of claim 12 wherein the system is a graphics subsystem, and wherein the processing unit is a graphics processing unit.

19. A computer program product comprising a non-transitory computer readable storage medium encoded with program code for controlling operation of a computer system to decrypt an encrypted secret, the program code including:
   a first code for encrypting a signature of the first code with a key to obtain an encrypted signature and for decrypting the encrypted secret with the encrypted signature to obtain the secret.

20. The computer program product of 19 wherein the program code further includes:
   program code for determining the signature of the first code;
   program code for encrypting the signature with the key to obtain an encrypted signature; and
   program code for encrypting the secret with the encrypted signature to obtain the encrypted secret.

21. The computer program product of 19 wherein the program code further includes:
   program code for authenticating the first code by:
      determining the signature of the first code using a code-signing key; and
      comparing the signature to an expected value for the signature; and
   program code for executing the first code if the signature equals the expected value.

* * * * *